United States Patent
Wabnig et al.

(10) Patent No.: US 9,929,806 B2
(45) Date of Patent: Mar. 27, 2018

(54) ALIGNMENT OF OPTICAL DEVICES

(71) Applicant: Nokia Technologies Oy, Espoo (FI)

(72) Inventors: Joachim Wabnig, Upper Cambourne (GB); Antti Niskanen, Cambridge (GB); Hongwei Li, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 195 days.

(21) Appl. No.: 14/890,219

(22) PCT Filed: May 14, 2013

(86) PCT No.: PCT/IB2013/053934
§ 371 (c)(1),
(2) Date: Nov. 10, 2015

(87) PCT Pub. No.: WO2014/184616
PCT Pub. Date: Nov. 20, 2014

(65) Prior Publication Data
US 2016/0087722 A1    Mar. 24, 2016

(51) Int. Cl.
*H04B 10/00* (2013.01)
*H04B 10/114* (2013.01)
*H04B 10/112* (2013.01)

(52) U.S. Cl.
CPC ..... *H04B 10/1143* (2013.01); *H04B 10/1125* (2013.01)

(58) Field of Classification Search
CPC .......................... H04B 10/1125; H04B 10/1143
USPC .......................................................... 398/131
See application file for complete search history.

(56) References Cited

U.S. PATENT DOCUMENTS

| | | | |
|---|---|---|---|
| 3,511,998 A | 5/1970 | Smokler et al. |
| 4,330,204 A | 5/1982 | Dye |
| 5,060,304 A | 10/1991 | Solinsky |
| 6,484,114 B1 | 11/2002 | Dickson |
| 7,389,052 B2 | 6/2008 | Oettinger et al. |
| 8,041,161 B1 | 10/2011 | Lane et al. |
| 8,054,976 B2 | 11/2011 | Harrison et al. |
| 8,200,094 B1 | 6/2012 | Zhovnirovsky et al. |

(Continued)

FOREIGN PATENT DOCUMENTS

| | | |
|---|---|---|
| CN | 101156098 A | 4/2008 |
| EP | 1952562 A2 | 8/2008 |
| GB | 2460252 | 11/2009 |

OTHER PUBLICATIONS

Office action received for corresponding Chinese Patent Application No. 201380078194.0, dated Feb. 24, 2017, 9 pages of office action and no pages of office action translation available.

(Continued)

*Primary Examiner* — Don N Vo
(74) *Attorney, Agent, or Firm* — Harringgton & Smith (57) ABSTRACT

Adjustment of an optical component of a device includes determining of at least one derivative of coupling efficiency of the optical component as a function of parameters used for control of a steering function of the optical component. At least one oscillating component is induced into the parameters for the determining. The adjustment of the optical component is based on the determined at least one derivative.

19 Claims, 4 Drawing Sheets

(56) References Cited

U.S. PATENT DOCUMENTS

| | | | |
|---|---|---|---|
| 8,995,841 B1* | 3/2015 | Chalfant, III | H04B 10/1125 398/119 |
| 2003/0081293 A1* | 5/2003 | Wood, Jr. | H04B 10/1121 398/126 |
| 2004/0057730 A1 | 3/2004 | Littlejohn et al. | |
| 2004/0120719 A1 | 6/2004 | Andreu-Von Euw et al. | |
| 2004/0208602 A1* | 10/2004 | Plante | H04B 10/1125 398/140 |
| 2005/0180753 A1 | 8/2005 | Wirth et al. | |
| 2006/0228072 A1 | 10/2006 | Davis et al. | |
| 2007/0031151 A1 | 2/2007 | Cunningham et al. | |
| 2011/0286749 A1 | 11/2011 | Schoon | |
| 2011/0303820 A1* | 12/2011 | Gollier | G02B 26/101 250/201.1 |

OTHER PUBLICATIONS

International Search Report and Written Opinion received for corresponding Patent Cooperation Treaty Application No. PCT/IB2013/053934, dated Feb. 18, 2014, 12 pages.

Extended European Search Report received for corresponding European Patent Application No. 13884601.9, dated Dec. 14, 2016, 8 pages.

Dat et al., "A Universal Platform for Ubiquitous Wireless Communications Using Radio Over FSO System", Journal of Lightwave Technology, vol. 28, No. 16, Aug. 15, 2010, pp. 2258-2267.

Haruyama et al., "New ground-to-train high-speed free-space optical communication system with fast handover mechanism", Optical Fiber Communication Conference and Exposition and the National Fiber Optic Engineers Conference, 2011, pp. 1-3.

\* cited by examiner

ALIGNMENT OF OPTICAL DEVICES

RELATED APPLICATION

This application was originally filed as PCT Application No. PCT/IB2013/053934 filed May 14, 2013.

BACKGROUND OF THE INVENTION

1. Field of the Invention

This disclosure relates to communications in free space and more particularly to alignment of optical devices for communications between the devices.

2. Description of Related Art

A communication link can be provided between two or more devices such as fixed and/or mobile communication devices, base stations and other access points, servers, machine type devices, and so on. Communications may occur in free space over wireless connections. An example of communications in free space is information transfer using light as the physical mechanism. Optical links can be provided for communication of various types of information, for example for communications of control and user information and/or for security applications.

Optical information transfer is conventionally enabled by fibre optics. A light signal can be transmitted between nodes because of total internal reflection of the fibre optics keeps the signal confined. Free-space communication can be provided e.g. based on laser beams. Directional free-space optical (FSO) communications has been used in many different contexts such as for example in close range communication, control and security applications. An example of FSO applications are high-bandwidth solutions where optical connectivity is provided to premises within the "last mile" of current optical fiber-based networks. FSO links are seen as advantageous for this type of deployment for example because FSO technology does not require Federal Communications Commission licensing, it is a viable transport medium for transmitting existing radio frequency (RF) signals in analogue format and it is considered immune to electromagnetic interference. Yet another example of applications of free space optical links is communication between different types of vehicles on land, on sea, airborne, or in space. More detailed examples of such applications include inter-vehicle traffic safety communications and communications in military context FSO has also been proposed to be used for ultra-high-bandwidth communication in handheld devices. Directive optical links are also a prerequisite for Quantum Key Distribution (QKD) which can be used to secure communications. It is noted that the above is not an exhaustive list of uses of FSO and that it is considered to have potential to extend to various new fields and applications in the future Alignment between communicating devices is needed when free space optical links are used. That is, to establish a directional optical link between two optical modules a module needs to adjust the direction of its beam, if it operates as an emitter, or its field of view, if the module operates as a receiver. Feedback related to the quality of the alignment is used as the basis of those adjustments. A basic method is to make incremental changes on all the parameters and, after each increment, the emitter and the receiver communicate to decide if the adjustment improved or deteriorated the alignment. This can be a lengthy process. In more advanced methods the emitter can rapidly scan a given solid angle or pattern and subsequently the emitter and receiver can communicate to decide which adjustment is appropriate. Improvements can also be made on the receiver side by using multiple detectors around the main receiver for example using a charge coupled device (CCD) camera. Although this allows the receiver to optimize its field of view without communicating with the emitter the emitter still needs feedback from the receiver to adjust its beam.

The known methods are based on communications between modules and/or some amount of trial-and-error. This can be time consuming. A problematic situation may also occur if at least one of the modules moves or the propagation medium is turbulent.

It is noted that the issues discussed here are not limited to any particular apparatus and application but may occur in any context where optical links might be needed.

Embodiments of the invention aim to address one or several of the above issues.

SUMMARY OF THE INVENTION

In accordance with an aspect there is provided a method for adjusting an optical component of a device, comprising determining at least one derivative of coupling efficiency of the optical component as a function of parameters used for control of a steering function of the optical component, wherein at least one oscillating component is induced into the parameters, and determining adjustment of the optical component based on the determined at least one derivative.

In accordance with another aspect there is provided a method for assisting in adjustment of an optical component of a device, comprising inducing by a second device at least one oscillating component into parameters that are to be used by the device for control of a steering function of the optical component to enable determination of adjustment of the optical component based on determined at least one derivative of coupling efficiency of the optical component as a function of the parameters.

In accordance with another aspect there is provided an apparatus comprising at least one processor, and at least one memory including computer program code, wherein the at least one memory and the computer program code are configured, with the at least one processor, cause the apparatus at least to determine at least one derivative of coupling efficiency of an optical component of a device as a function of parameters used for control of a steering function of the optical component, wherein at least one oscillating component is induced into the parameters, and determine adjustment of the optical component based on the determined at least one derivative.

In accordance with a yet another aspect there is provided an apparatus comprising at least one emitter of an optical beam, and a controller configured to control the at least one emitter, wherein the apparatus is configured at least to cause inducing of at least one oscillating component into parameters that are to be used by a receiver of the optical beam for control of a steering function of an optical component of the receiver to enable determination of adjustment of the optical component based on determined at least one derivative of coupling efficiency of the optical component as a function of the parameters.

In accordance with a more detailed aspect the position of the optical component is adjusted based on the determined adjustment. The steps of determining and adjusting can be performed iteratively until a predefined quality of an optical signal is achieved.

Direction of a field of view of the optical component and/or an optical beam emitted by the optical component can be controlled based on the determination.

The at least one oscillating component can be induced into the parameters by applying an oscillating component to each parameter used for controlling the steering function of the optical component.

The at least one oscillating component can be induced into the parameters by applying oscillations into optical beams emitted by another optical component.

The at least one oscillating component can be induced into the parameters by simulating oscillations by switching periodically auxiliary beacons emitted by auxiliary emitters.

Fourier components at the frequency applied to each parameter can be determined.

At least two adjustment procedures of different level of precision can be provided. In a more particular embodiment a coarse alignment wherein derivatives are determined for diverging beacons and a precise alignment wherein derivatives are determined for a principal optical beam are provided.

A device such as a mobile communication device and/or a stationary or non-stationary target device arranged to implement the embodiments is also provided. A system comprising at least one of such devices can be provided.

A computer program comprising program code adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings, in which.

DETAILED DESCRIPTION OF THE INVENTION

In the following certain exemplifying embodiments are explained in the context where communications are provided on an optical link between two optical apparatus, for example between two mobile devices or between a mobile device and a stationary terminal device. A mobile device can be e.g. a handheld or otherwise portable device. A mobile device of a user for communications is often referred to as user equipment (UE) or terminal. A mobile device for implementing the embodiments may be provided by any device provided with optical communication apparatus for communication on an optical channel. The mobile device may also be capable of sending signals to and/or receiving wireless signals on a channel provided for example by a cellular system and/or a local wireless system. Non-limiting examples of mobile devices include a mobile station (MS) such as a mobile phone or what is known as a 'smart phone', a portable computer such as a laptop, tablet or a personal data assistant (PDA) provided with wireless communication capabilities, other portable device such as wearable wireless devices integrated with eyewear, helmets, hats, clothing and so on, universal serial bus (USB) sticks with wireless capabilities, modem data cards or any combinations of these or the like.

Figure 1A:
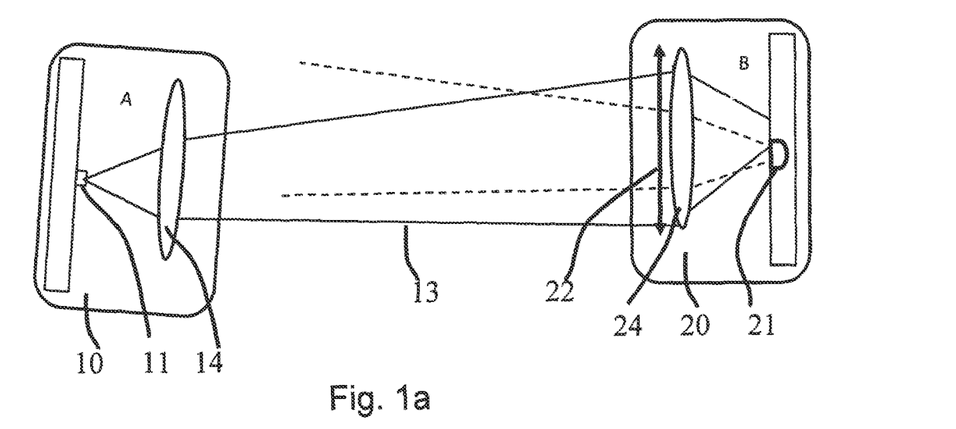
FIGS. 1a and 1b show schematic diagrams of two co-operative devices in accordance with certain embodiments.
Figure 1B:
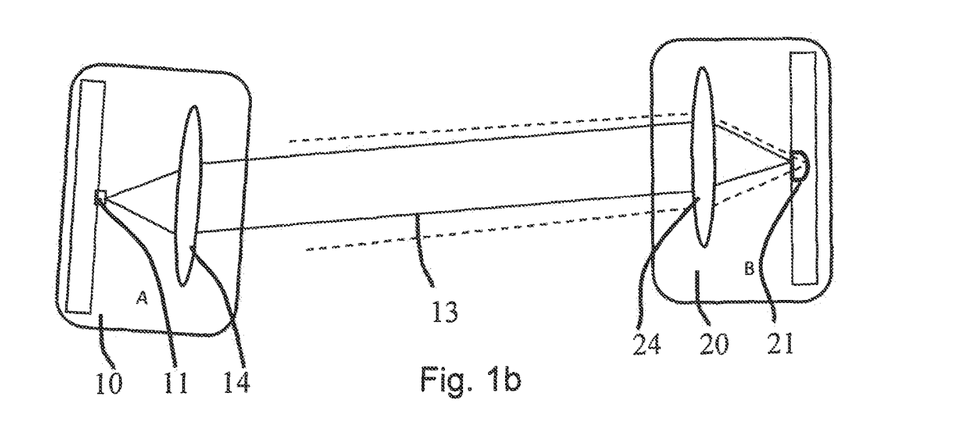

In FIGS. 1a and b a system comprising devices 10 and 20 communicating via an optical link is shown. FIGS. 1a and b show a sender device 10, labelled terminal A, and a recipient or target device 20, labelled terminal B. The devices provide optical modules configured to maximize the coupling efficiency of an optical laser based directional communication link. The optical link can be provided, for example in the range of ultraviolet (UV) to infrared (IR), or as any other wavelike signal. One of the devices 20 comprises a detector apparatus 21 with a known field of view and the possibility to adjust its direction. The other device 10 can be provided with an emitter 11 or a (retro-) reflector. In free space optical link establishment between devices 10 and 20 the emitter 11 produces an optical beam 13 able to go through the receiver's optical aperture 22 by emitting in an appropriate direction with an appropriate focus. The receiving device's field of view (FOV) encompasses the emitter e.g. by looking in the appropriate direction with the appropriate focalization. In FIG. 1b the emitted beam 13 goes through the aperture 22 but the shown field of view is not optimal and the beam does not focus at the detector 21. FIG. 1b shows a situation where the field of view encompasses the emitter 11 and the beam 13 focuses at the detector 21.

Figure 2:
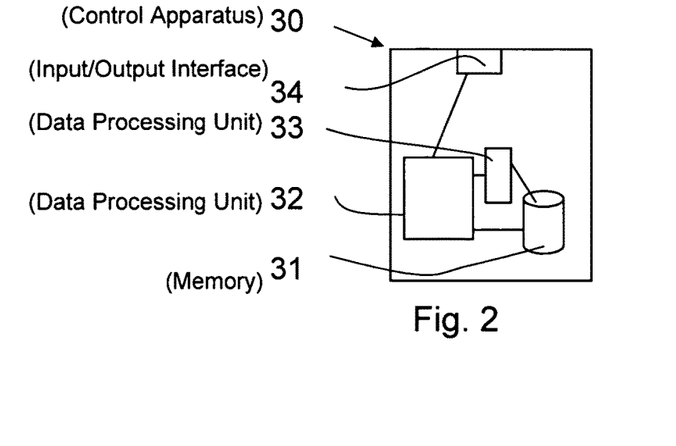
FIG. 2 shows an example of control apparatus.

A possibility to steer and focus the beam is to align the optical modules in appropriate degrees of freedom. Devices 10 and 20 have been provided with the capability to adjust their beam/FOV by setting their direction (e.g. two degrees of freedom each) and divergence/focus (e.g. one degree of freedom each). In the example of FIG. 1 the steering of the emitted and received beam can be provided by lenses 14 and 24, respectively. Information about how the current optical modes match is provided and changes in steering and focusing are calculated. An example of apparatus suitable for these determinations and for controlling the adjustment is shown in FIG. 2.

Devices capable of communications on optical links are typically controlled by at least one appropriate controller apparatus so as to enable operation thereof and control various aspects of communications between the devices and/or other parties. The control apparatus can be interconnected with other control entities. FIG. 2 shows an example of control apparatus 30 capable of operating in accordance with the embodiments, for example to be coupled to and/or for controlling either of devices 10 and 20 of any of FIGS. 1, 5 and 6. The control apparatus can be configured to provide control functions in association with determination of various information, generation and communication of information between the various entities and/or control functions based on such information by means of the data processing facility thereof in accordance with the certain embodiments described herein. For this purpose the control apparatus comprises at least one memory 31, at least one data processing unit 32, 33 and an input/output interface 34. The control apparatus can be configured to execute an appropriate software code to provide the control functions. For example, the control apparatus can provide required functionality for control of determinations, measurements and steering, emitting, detecting, beaconing, decoding/encoding and/or other functionalities devices 10 and 20 and/or the optical modules thereof may have been provided with.

The control apparatus and functions may be distributed between a plurality of control units. The data processing, storage and other relevant control apparatus may be provided on an appropriate circuit board and/or in chipsets.

To provide appropriate degrees of freedom direction of the optical mode can be controlled for example by one mirror capable of rotation around two axis or two mirrors able to rotate around one axis each. The two mirrors may be arranged parallel to each other. The rotation axis thereof can be perpendicular, or un-parallel to the extend it is possible to achieve desired adjustment range. Also, one collimating lens able to move in two dimensions (2D) with respect to a wide numerical aperture emitter/receiver or vice versa (the emitter/receiver moving) can be used. Two cylindrical lenses able to move in one direction each, preferably perpendicular to each other are also a possibility. The whole module including the collimating lens and the emitter/receiver can be rotated around two axis. A two-dimensional (2D) phased array/spatial phase modulator (multiple areas where the optical phase can be individually controlled) is also a possibility.

The mode divergence/focus can be controlled for example by adjusting the distance between a collimating lens and a diverging emitter/receiver, by a tuneable lens, or by a 2D phased array/spatial phase modulator.

A radio frequency (RF) wireless link may also be provided between devices 10 and 20, should this be required by a particular application. Both devices can be provided with a communication subsystem for the wireless communications, for example with appropriate radio apparatus to facilitate wireless communications. It is noted that a communication channel between can also be provided based on other technologies.

The following discusses some examples of techniques for allowing establishment of optical links in a fast and robust way between moving modules or fixed modules separated by a turbulent medium.

Information where to point the laser beam of the emitter and/or how to adjust the field of view of the detector is obtained. In accordance with an example this is based on the analogue evaluation of the first and second derivatives of the coupling efficiency as a function of the physical steering parameters. Those derivatives can be obtained by inducing oscillating components in the parameters. The modulation amplitude of the detected signal can give information about what adjustment to perform almost instantaneously. This can be achieved, in certain exemplifying scenarios, after only a few oscillation cycles.

The oscillation can be provided by appropriate hardware, for example by oscillating lenses and/or mirrors, laser scanning, phased arrays and so forth. The hardware can be arranged to perform the oscillation faster than the motion of the modules. For example, the oscillation can be in the order of tens or hundreds of hertz depending on the application.

Figure 3:
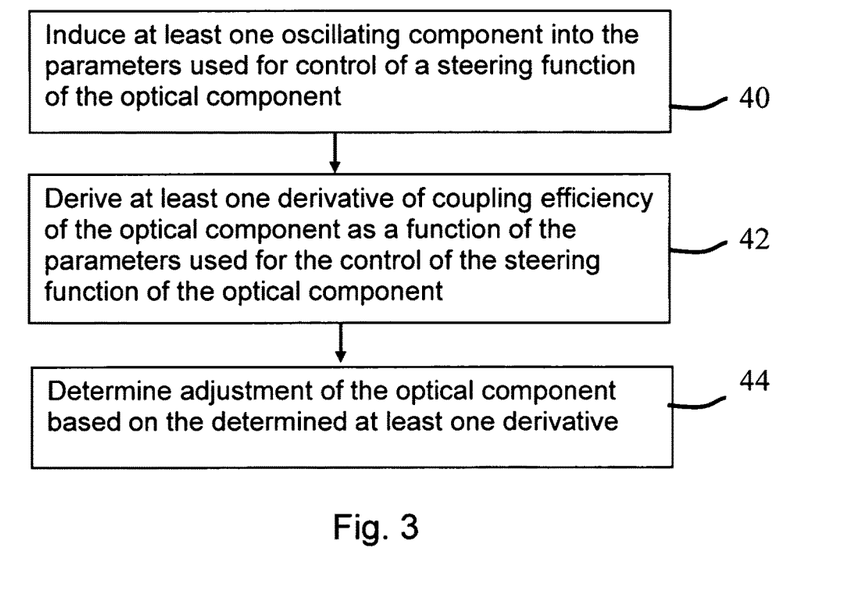
FIG. 3 is a flowchart in accordance with an embodiment.

FIG. 3 shows a flowchart of an example of a method for aligning an optical component of a device. At step 40 at least one oscillating component is induced into the parameters used for control of a steering function of the optical component. The inducing may be provided in one or both the devices, and relate to a primary optical beam and/or at least one auxiliary beam/beacon, as will be explained later. In 42 at least one derivative of coupling efficiency of the optical component as a function of the parameters used for the control of the steering function of the optical component is determined. An adjustment of the optical component is then determined are 44 based on the determined at least one derivative.

The position of the optical component can then be adjusted based on the determined adjustment. The steps of determining and adjusting can be performed iteratively until a predefined quality of an optical signal is achieved.

In accordance with an embodiment steps 42 and 44 are provided in a device receiving a beam. The other device in a pair of optical device can assists in the adjustment of the optical component of the receiving device by providing step 40, i.e. by inducing at least one oscillating component into the parameters that are to be used for control of the steering function of the optical component. The other device provides this to enable determination of adjustment of the optical component by the receiving device based on the determined at least one derivative of coupling efficiency of the optical component.

In accordance with a possibility the alignment between the modules is provided in stages. A coarse alignment can be first performed by maximizing the coupling of a divergent beacon and a detector. Precision alignment can then be performed directly by evaluating the derivatives of the communication link coupling efficiency. These features together allow for efficient finding of a coupling efficiency maximum.

In accordance with a possibility the alignment, or at least most of the alignment, can be done without communication between the modules or the devices associated with the modules. The adjustment required on the different parameters can be known immediately with the data available at any given moment by each module.

Two different types of exemplifying solutions that can be applied to induce oscillations and measure the derivatives are now described in greater detail. Each example is applicable to both the coarse and precise alignments.

In accordance with a first possibility a small and fast oscillating component is applied to each parameter controlling the direction of the beam by an emitting module and/or field of view by a detecting module. Thus, a measurement whose average value is proportional to the coupling efficiency will also have Fourier components at the frequency applied to each parameter. Those components are proportional to the first derivatives. Other Fourier components will appear at double and sum frequencies. Those are proportional to the second and cross derivatives respectively.

According to another possibility the oscillations can be applied on the beacon in the detecting module. Those oscillations can also be simulated by having several auxiliary beacons around the central one being switched on periodically.

If those measurements are accurate and the beam and field of view are Gaussian, the direction parameters can be adjusted in one step to optimize the coupling. The techniques work also for non-Gaussian or noisy modes but may require a few more iterations.

If the oscillation frequency is different for each direction parameter it is possible to measure each Fourier component separately and calculate the adjustment required on all the parameters simultaneously.

Figure 4A:
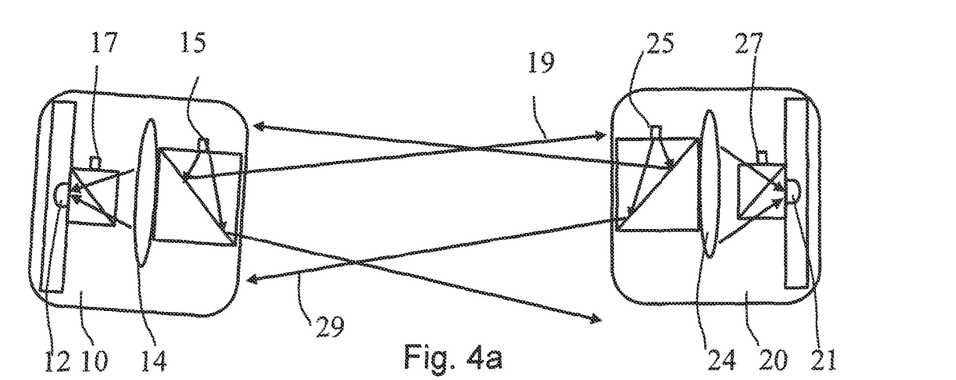
FIGS. 4a, 4b, 5a and 5b show schematic diagrams of two co-operative devices in accordance with further embodiments.
Figure 4B:
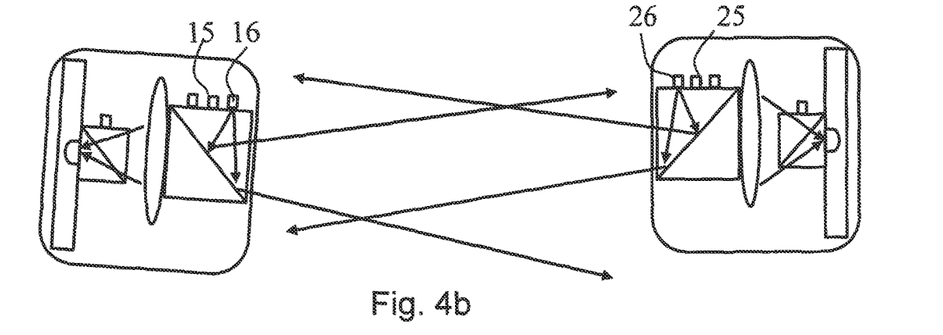

A more particular example for alignment of two modules will now be described with reference to FIGS. 4 to 6. Where appropriate the modules can be called as an emitting module and a detecting module depending on their function. Modules 10 and 20 can obtain measurement information enabling them to calculate how to adjust their parameters to the quality of the mode matching. Both modules have the possibility to emit and receive to and from the same direction (e.g. by using a beam splitter or a dichroic element if the wavelengths are different). In this example it is assumed that the emitted beam and receiving field of view are both Gaussian.

A coarse alignment is provided first. Before any alignment is performed it can be useful to have a wide angle emitting beacon in each module in order to indicate its position to the other module. The receiving module 20 may also defocus its field of view enough to get a detectable level of light from the beacon. The receiving module 20 can then perform measurements needed to adjust its optics in various ways.

In accordance with a possibility a small and fast oscillating component s applied to each of the parameters controlling the direction of the field of view. In FIG. 4a the direction of view can be controlled by the position of the lens 24. Each module 10, 20 is provided with a detector 12, 21, respectively. In the example each detector has a Gaussian field of view. The detectors can be used for appropriate measurements to determine coupling efficiency, for example for power measurements. FIG. 4a shows a beacon 15, 25 in each module. The beacons are used to indicate the respective position of the module by beams 19 and 29. The measurement performed by the detector 11, 21 can be related to the distance, in the parameter space, to the perfect alignment with a Gaussian dependence. This measurement also has Fourier components at the frequency applied to each parameter. Those components are proportional to the first derivatives of the Gaussian as a function of the parameters. Other Fourier components will appear at double and sum frequencies. Those are proportional to the second and cross derivatives respectively.

Oscillations can be applied to the beacon by the transmitting module. Alternatively, or in addition, oscillations can be applied on the beacon in the receiving module. The oscillations can be simulated by having several auxiliary beacons 16, 26 around the central beacon 15, 25 being switched on periodically. An example of auxiliary beacons 16 and 26 are shown on FIG. 4b.

The information may also be obtained with assistance of auxiliary detectors around the main detector. It is also possible to replace the beacons by retro-reflectors that can be illuminated by the same module that will perform the measurement. This enables each module to operate in a completely autonomous way.

Figure 5A:
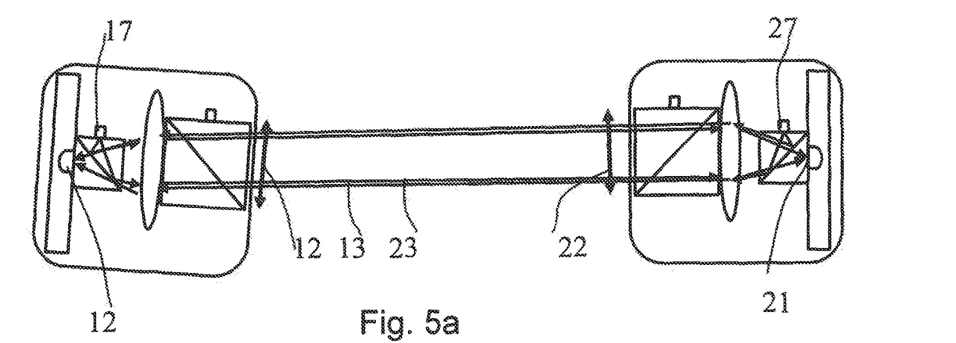
Figure 5B:
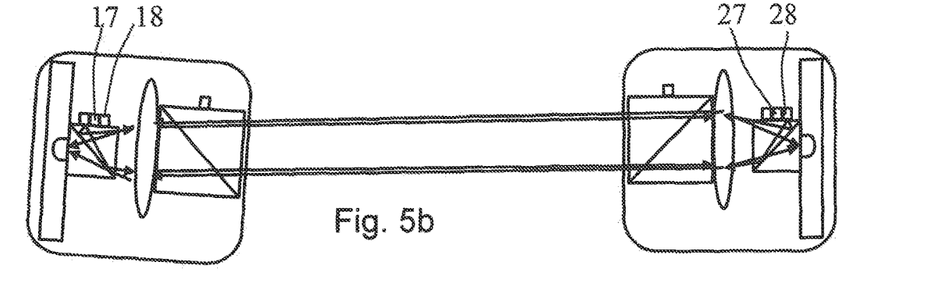

FIG. 5a shows that the two contra propagating beams 19 and 29 are transmitted through the respective apertures 12 and 22 of the modules 10 and 20. Once the rough alignment is sufficiently advanced so that the principal emitter 17, 27 of each module produces a beam that is fully transmitted through the aperture 12, 22 of the other module, a more precise alignment procedure can be performed. Instead of using the diverging beacons for this it is possible to use the principal emitters 17, 27 and receivers 12, 21 that will be used for the information channel. This is shown in FIG. 5a by beams 13 and 23. It is also possible to use emitters/receivers that emit/receive in the same optical mode as the principal ones. Measurements allowing calculation of the appropriate adjustments can be performed in a similar way as with coarse alignment by oscillation of the parameters controlling the direction of the field of view and the beam.

Alternatively, or in addition, auxiliary emitters can be used to simulate an oscillation. Auxiliary emitters 18 and 28 are shown on FIG. 5b.

Combinations of the two different approaches can also be beneficial. Combinations may be used for each alignment stage. This can be so especially for the measurement of the second derivatives as these can be based on weak signals. For example, it is possible to switch on one auxiliary beacon, make an oscillatory measurement (first derivative) and then repeat the operation with another beacon. A differentiation between the two first derivatives can then be provided in order to get the second derivatives.

The steering and focusing can be adjusted based on calculated displacement needed for each degree of freedom. Both the coarse alignment step with the beacons and the fine alignment step can use the same calculation to adjust the parameters. A difference is that the signal depends on three parameters in the coarse alignment and six parameters in the second alignment.

The parameters related to the six degrees of freedom are called herein $X_A$, $Y_A$, $Z_A$, $X_B$, $Y_B$ and $Z_B$. X and Y correspond to degrees of freedom related to the direction and Z to the focalization. In case a lens moving in three directions is used to steer and focus the beam X, Y and Z can correspond to the coordinates of lens in space. However X and Y can be any parameter linearly (in first approximation) related to the elevation and azimuth of the beam and Z can be any parameter adjusting the focus. The relative motion of devices 10 and 20 is considered herein to be slow compared to the parameter adjustments. The optical beam is considered herein to be Gaussian even though the proposed method can accommodate shapes deviating from this ideal.

First, the divergence of the optical modes is increased until some signal is detected. Afterwards, the directions are optimized, for example as explained in the theory below. Then the divergence is reduced and the direction optimization iteration starts again.

Figure 6:
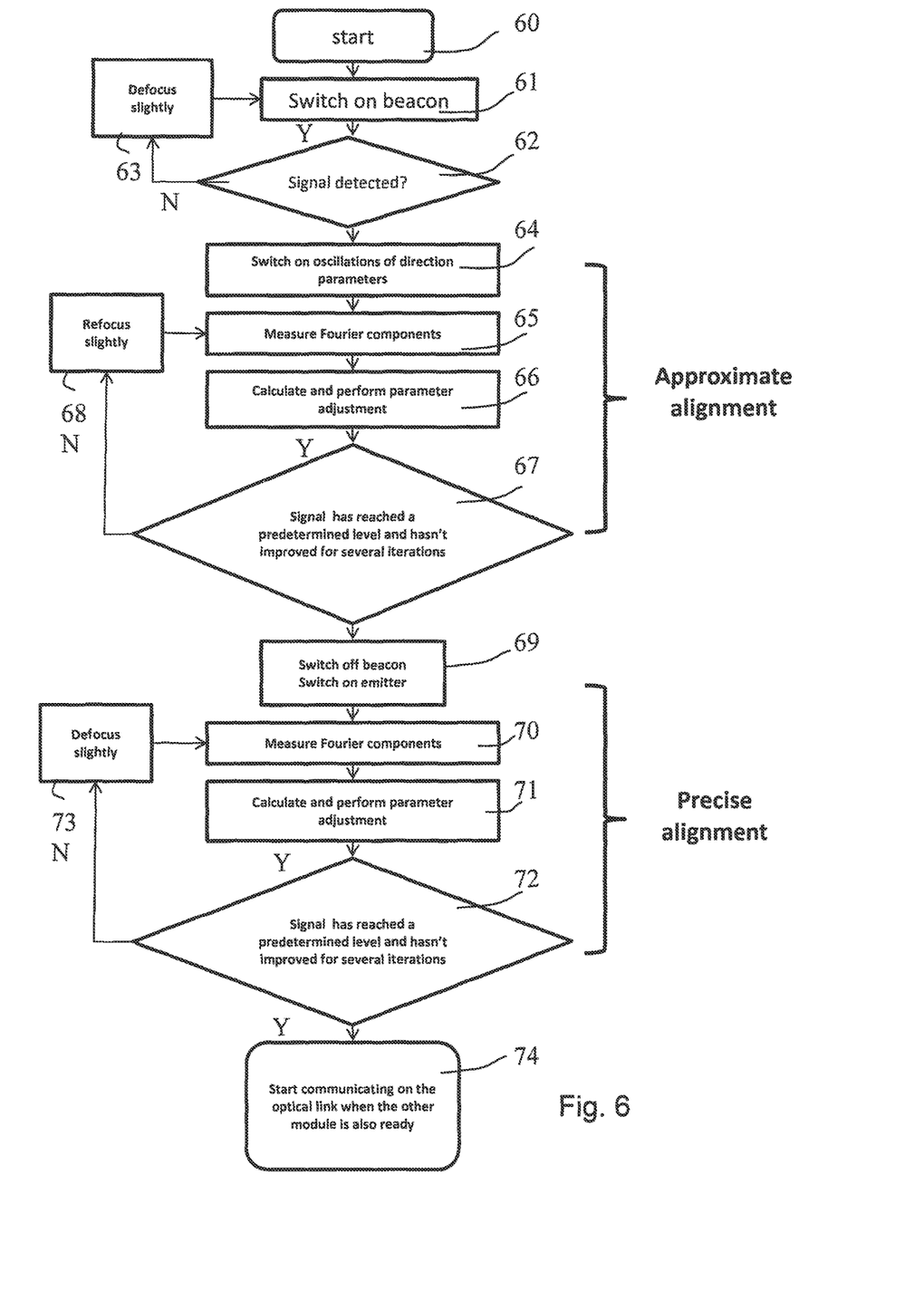
FIG. 6 is a flowchart in accordance with an embodiment.

This sequence in one of the modules is shown in detail in the flowchart of FIG. 6. The operation starts at 60 where after a beacon is switched on at 61. If no signal from the other device is detected at 62 a slight defocusing can be performed at 63 and the operation returns via 61 to 62. When a signal is detected the operation moves to approximate alignment state along the lines shown in FIG. 4b at 64 where oscillation of direction parameters is switched on. Fourier components are measured at 65 where after calculation and parameter adjustment can be performed at 66. When the signal has reached a predetermined level and/or has not improved for several iterations it can be determined at 67 that the first alignment iteration stage is complete and the procedure can move to step 69 where the second, more precise alignment iteration takes place. If not, a slight defocusing takes place at 68 and the procedure returns to 65.

At 69 the beacon is switched off and the emitter is switched on. Fourier components are measured at 70 where after calculation and parameter adjustment can be performed at 71. It can be determined at 72 whether the signal has reached a predetermined level and/or has not improved for several, predefined number of iterations. If not, a slight defocusing takes place at 73 and the procedure returns to 70. If yes, it is determined that the second alignment iteration stage is complete and the procedure can move to step 74 where communication of the optical link can start when the other module is also ready.

Some general theory underlying the above example is discussed next. Generally, a detected power as a function of one of the direction parameters ($X_A$, $Y_A$, $X_B$ or $Y_B$) can be considered as being approximately Gaussian. For example, for varying $X_A$, and all the other parameters remaining constant, the power can be expressed as:

$$P_{X_B,Y_A,Y_B,Z_A,Z_B}(X_A) = f_{X_B,Y_A,Y_B,Z_A,Z_B} e^{-(X_A - X_{A_0})^2/\sigma^2}$$

$X_{Ao}$, f and σ are unknown because they depend on the relative position and orientation of the devices A and B. $X_A$, $Y_A$, $Z_A$, $X_B$, $Y_B$ and $Z_B$ are the known applied parameters (voltage, current . . . ). The actual beam direction and divergence they control will be considered as linear but unknown functions of those parameters.

Consider the coefficient $$F_{X_A} = \frac{1}{p}\frac{\partial P}{\partial X_A}.$$

For a Gaussian beam $$F_{X_A} = 2\frac{X_{Ao} - X_A}{\sigma^2}.$$

This is conveniently proportional to the change needed to apply on $X_A$ in order to maximize power and independent on the other direction parameters.

By extension to the other parameters it can be defined $F=(F_{XA},F_{YA},F_{XB},F_{YB})$ and $V=(X_A,Y_A,X_B,Y_B)$ Variations of the parameter vector V induce variations in F as follows:

$$dF = JdV$$

$$\text{With } J = \begin{pmatrix} \frac{dF_{X_A}}{dX_A} & \frac{dF_{X_A}}{dX_B} & \cdots \\ \frac{\partial F_{X_B}}{\partial X_A} & \ddots & \\ \vdots & & \ddots \end{pmatrix}$$

In most cases, non-diagonal terms are equal to zero (e.g. if the beam is Gaussian with cylindrical symmetry and the directions controlled by V are orthogonal).

The power P is maximized when F=0, so F has to change by ΔF=−F

The variation of parameter to obtain this result is ΔV=−$J^{-1}$F.

For perfectly Gaussian, noiseless, static optical beams the optimization can be performed in one step. In practice, this might require several iterations.

In order to perform this calculation several values are obtained from the measurements:

$$P$$

$$F_i = \frac{1}{P}\frac{\partial P}{\partial V_i}$$

$$J_{ij} = \frac{\partial F_i}{\partial V_j} = -\frac{1}{P^2}\frac{\partial P}{\partial V_j} + \frac{1}{P}\frac{\partial^2 P}{\partial V_i \partial V_j}.$$

Once the power and its first and second derivatives with respect to the different direction parameters are known, it is possible to calculate the set of parameters that will maximize the power in one step.

Applying oscillating components with different frequencies for each parameter enables retrieval of those derivatives from different Fourier components as demonstrated in the following Taylor expansion of the detected power:

$$P(X_{Ao} + \delta\sin(\omega_{XA}t), X_{Bo} + \delta\sin(\omega_{XB}t), \ldots) =$$

$$P(X_{Ao}, X_{Bo}, \ldots) + \delta\frac{\partial P}{\partial X_A}\sin(\omega_{XA}t) +$$

$$\delta\frac{\partial P}{\partial X_B}\sin(\omega_{XB}t) + \ldots \text{ (first derivatives)} + \frac{\delta^2}{4}\frac{\partial^2 P}{\partial X_A^2}(1 - \cos(2\omega_{XA}t)) +$$

$$\frac{\delta^2}{4}\frac{\partial^2 P}{\partial X_B^2}(1 - \cos(2\omega_{XB}t)) + \ldots \text{ (second derivatives)} + \frac{\delta^2}{4}\frac{\partial^2 P}{\partial X_A X_B}$$

$$(\cos((\omega_{XA} + \omega_{XB})t) - \cos((\omega_{XA} - \omega_{XB})t)) + \ldots \text{ (cross derivatives)}$$

It can be seen that the amplitude of each Fourier component is proportional to a given derivative.

In the figures systems are represented where the steering can be done by moving a lens but the herein described principles can be adapted to all types of implementations. Also the beam splitters allowing emission/reception to/from the same direction are shown in their free space version but this can be done on integrated optics platforms.

Each degree of freedom can be addressed by a different technique out of the aforementioned. Interestingly, the three degrees of freedom can be addressed at once by moving the collimated lens in three dimensions (3D) or by a phased array.

According to an example appropriate apparatus or means are provided for controlling a device, for example a handheld of otherwise mobile device, to provide the various embodiments.

In accordance with an embodiment apparatus for adjusting an optical component of a device can comprise means for determining at least one derivative of coupling efficiency of the optical component as a function of parameters used for control of a steering function of the optical component, wherein at least one oscillating component is induced into the parameters, and means for determining adjustment of the optical component based on the determined at least one derivative.

In accordance with another embodiment apparatus for assisting in adjustment of an optical component of a device can comprise, in a second device, means for inducing at least one oscillating component into parameters that are to be used by the device for control of a steering function of the optical component to enable determination of adjustment of the optical component based on determined at least one derivative of coupling efficiency of the optical component as a function of the parameters.

Means for adjusting the position of the optical component based on the determined adjustment can also be provided. The means for determining and adjusting can perform the determining and adjusting iteratively until a predefined quality of an optical signal is achieved.

The means for adjusting can provide at least two adjustment procedures of different levels of precision. These can comprise a coarse alignment wherein derivatives are determined for diverging beacons and a precise alignment wherein derivatives are determined for a principal optical beam.

The herein described examples can be beneficial as the alignment may require reduced number of iterations steps and/or less communication between the optical modules.

The adjustment can be provided on continuous on non-continuous basis.

It is noted that whilst embodiments have been described using a mobile device as an example, similar principles can be applied to any other device capable of optical links and where alignment is needed between the devices. Therefore, although certain embodiments were described above by way of example with reference to certain exemplifying mobile devices and technologies, the principles can be applied to any other suitable forms of devices than those illustrated and described herein.

The required data processing apparatus and functions at the relevant devices may be provided by means of one or more data processors. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for adjusting an optical component of a device, comprising:
   determining at least one derivative of coupling efficiency of the optical component as a function of parameters used for control of a steering function of the optical component, wherein at least one oscillating component is induced into the parameters, and
   determining adjustment of the optical component based on the determined at least one derivative.

2. A method according to claim 1 further comprising:
   adjusting the position of the optical component based on the determined adjustment, and
   performing the steps of determining and adjusting iteratively until a predefined quality of an optical signal is achieved.

3. A method according to claim 1 further comprising:
   controlling the direction of a field of view of the optical component and/or an optical beam emitted by the optical component.

4. A method according to claim 1 further comprising:
   inducing the at least one oscillating component into the parameters by applying an oscillating component to each parameter used for controlling the steering function of the optical component.

5. A method according to claim 1 further comprising:
   inducing the at least one oscillating component into the parameters by applying oscillations into optical beams emitted by another optical component.

6. A method according to claim 1 further comprising:
   inducing the at least one oscillating component into the parameters by simulating oscillations by switching periodically auxiliary beacons emitted by auxiliary emitters.

7. A method according to claim 1 further comprising:
   determining Fourier components at the frequency applied to each parameter.

8. A method according to claim 1 further comprising:
   at least two adjustment procedures of different level of precision.

9. A method for assisting in adjustment of an optical component of a device, comprising:
   inducing by a second device at least one oscillating component into parameters that are to be used by the device for control of a steering function of the optical component to enable determination of adjustment of the optical component based on determined at least one derivative of coupling efficiency of the optical component as a function of the parameters.

10. An apparatus comprising:
    at least one processor, and
    at least one memory including computer program code, wherein the at least one memory and the computer program code are configured, with the at least one processor, to cause the apparatus at least to:
    determine at least one derivative of coupling efficiency of an optical component of a device as a function of parameters used for control of a steering function of the optical component, wherein at least one oscillating component is induced into the parameters, and
    determine adjustment of the optical component based on the determined at least one derivative.

11. An apparatus as claimed in claim 10, further configured to adjust the position of the optical component based on the determined adjustment, and to determine the at least one derivative and adjust the position iteratively until a predefined quality of an optical signal is achieved.

12. An apparatus as claimed in claim 10, wherein the at least one oscillating component is induced into the parameters by oscillations applied into optical beams emitted by another optical component.

13. An apparatus as claimed in claim 10, further configured to determine Fourier components at the frequency applied to each parameter.

14. An apparatus comprising:

at least one emitter of an optical beam, and a controller configured to control the at least one emitter, wherein the apparatus is configured at least to cause inducing of at least one oscillating component into parameters that are to be used by a receiver of the optical beam for control of a steering function of an optical component of the receiver to enable determination of adjustment of the optical component based on determined at least one derivative of coupling efficiency of the optical component as a function of the parameters.

15. An apparatus as claimed in claim 14, configured for use in control of direction of a field of view of the optical component and/or direction of an optical beam emitted by the optical component.

16. An apparatus as claimed in claim 14, further configured to cause inducing of the at least one oscillating component into the parameters such an oscillating component is applied to each parameter used for controlling the steering function of the optical component.

17. An apparatus as claimed in claim 14, wherein the at least one oscillating component is induced into the parameters based on simulated oscillations provided by switching periodically auxiliary beacons emitted by auxiliary emitters.

18. An apparatus as claimed in claim 14, wherein the adjustment comprised at least two adjustment procedures of different level of precision.

19. An apparatus as claimed in claim 18, wherein the at least two adjustment procedures comprise a coarse alignment wherein derivatives are determined for diverging beacons and a precise alignment wherein derivatives are determined for a principal optical beam.

* * * * *